(12) United States Patent
Skomsvold

(10) Patent No.: US 12,203,414 B2
(45) Date of Patent: Jan. 21, 2025

(54) DEVICE TO PRODUCE HIGHER PRESSURE AND TEMPERATURE IN A GAS

(71) Applicant: Hyper Energy Australia Pty Ltd, Darlinghurst (AU)

(72) Inventor: Åge Jørgen Skomsvold, Tønsberg (NO)

(73) Assignee: Hyper Energy Australia Pty Ltd, Darlinghurst (AU)

( * ) Notice: Subject to any disclaimer, the term of this patent is extended or adjusted under 35 U.S.C. 154(b) by 0 days.

(21) Appl. No.: 18/579,841

(22) PCT Filed: Jul. 1, 2022

(86) PCT No.: PCT/NO2022/050159
§ 371 (c)(1),
(2) Date: Jan. 16, 2024

(87) PCT Pub. No.: WO2023/287295
PCT Pub. Date: Jan. 19, 2023

(65) Prior Publication Data
US 2024/0328353 A1    Oct. 3, 2024

(30) Foreign Application Priority Data
Jul. 16, 2021 (NO) .................................... 20210915

(51) Int. Cl.
*F02C 7/08* (2006.01)
*F02C 3/34* (2006.01)

(52) U.S. Cl.
CPC ............... *F02C 7/08* (2013.01); *F02C 3/34* (2013.01); *F05D 2260/213* (2013.01); *F05D 2260/2214* (2013.01)

(58) Field of Classification Search
CPC ...................................... F02C 7/08; F02C 3/34
See application file for complete search history.

(56) References Cited

U.S. PATENT DOCUMENTS

| | | | |
|---|---|---|---|
| 2,914,918 A | 12/1959 | Kaplan | |
| 3,657,898 A | 4/1972 | Ness et al. | |
| 3,742,702 A * | 7/1973 | Quinn | F23R 3/04 60/39.23 |
| 3,765,170 A * | 10/1973 | Nakamura | F02C 6/003 60/39.17 |
| 4,382,359 A * | 5/1983 | Sampayo | F28D 7/06 60/39.511 |
| 5,303,253 A | 4/1994 | Henning et al. | |
| 6,205,768 B1 * | 3/2001 | Dibble | F23G 7/07 60/39.511 |
| 2005/0028529 A1 | 2/2005 | Bartlett et al. | |

(Continued)

FOREIGN PATENT DOCUMENTS

EP 2644847 A1 10/2013

OTHER PUBLICATIONS

International Search Report issued in the corresponding Application No. PCT/NO22/050159, dated Sep. 15, 2022.

(Continued)

*Primary Examiner* — William H Rodriguez
(74) *Attorney, Agent, or Firm* — Morgan, Lewis & Bockius LLP

(57) ABSTRACT

The present disclosure provides a device to produce higher pressure and temperature in a gas, the device including a rotation device adapted to rotate a shaft, an inlet for gas, and at least one shovel wheel.

11 Claims, 4 Drawing Sheets

(56) References Cited

U.S. PATENT DOCUMENTS

| | | |
|---|---|---|
| 2005/0235626 A1 | 10/2005 | Hull et al. |
| 2006/0112692 A1 | 6/2006 | Sundel |
| 2006/0112693 A1 | 6/2006 | Sundel |
| 2006/0116036 A1 | 6/2006 | Sundel |
| 2010/0061838 A1 | 3/2010 | Skomsvold |
| 2016/0237894 A1 | 8/2016 | Kupratis et al. |
| 2017/0298822 A1 | 10/2017 | Garde et al. |
| 2019/0128570 A1 | 5/2019 | Moxon |
| 2023/0258125 A1* | 8/2023 | Terwilliger ............... F02K 3/06 60/39.5 |
| 2024/0003295 A1* | 1/2024 | Hachem ................... F02C 7/047 |
| 2024/0254917 A1* | 8/2024 | Terwilliger ............... F02C 7/36 |

OTHER PUBLICATIONS

Written Opinion of the International Search Authority issued in the corresponding Application No. PCT/NO22/050159, dated Sep. 15, 2022.

Norwegian Search Report issued in the corresponding Application No. 20210915, dated Nov. 11, 2021.

Extended European Search Report issued in corresponding European Patent Application No. 22842537.7, dated Sep. 20, 2024.

\* cited by examiner

DEVICE TO PRODUCE HIGHER PRESSURE AND TEMPERATURE IN A GAS

FIELD OF THE INVENTION

The following invention is related to a device for producing high pressure and temperature in a gas, as the device can be any kind of compressor, ranging from a compressor that produces liquid gas to an ordinary vacuum cleaner.

TECHNICAL BACKGROUND

Current procedures and devices for producing low pressure or overpressure usually involve the fluid being set in motion with the help of a compressor, this can be a centrifugal compressor as in a vacuum cleaner, which rotates with the help of means, which can be an electric motor, to drive the air through the compressor that forms a low pressure in front of the inlet and a dynamic pressure after the compressor. The energy loss with this method develops heat and comes from the motor, frictions and not the least when the dynamic pressure after compressor can form an approximate static pressure after a diffuser that is not used in today's vacuum cleaners. There are also installed a variety of dust filters to avoid particles in common vacuum cleaners. These filters reduce further airflow from when they are new/clean and more as the filters are clogged with particles. Today's appliances also emit a lot of noise, both from the motor, compressor and air velocity into-, inside- and out of-the vacuum cleaner.

On the other hand, today, a number of ineffective compression methods are used for liquefaction of gases and in internal combustion engines that do not harness the heat produced by compression and frictions to achieve higher pressure so that the added energy can be reduced.

SUMMARY OF THE INVENTION

The object of the present invention is to produce a device for compression of a gas where energy recovery of the added energy is achieved by utilizing both mechanical and thermal development to achieve the intended in addition to being able to remove particles from the gas.

This is achieved with a device according to the attached claims.

The invention in question can exploit the energy loss from the heat development of the device to regain this as work, so that the added energy to the rotation device can be reduced, but at the same time maintain the capacity of the compressor, as well as that noise and particle throughput from the device is significantly reduced, as particles are captured by the centrifugal force and are regularly removed with a device. Thus, several filters can be excluded and improve throughput and further reduce energy consumption.

The invention's regeneration of the heat to achieve higher pressure, where it is then beneficial if the added energy instead of electricity is from other sources such as excess heat, solar heat and/or a fuel that burns in the device and the heat utilization provides both higher pressure from the device and can be utilized through a turbine that provides more work than the rotation device requires and the invention becomes a pressure and heat energy utilization engine and/or internal combustion engine that also has a method for capturing the produced $CO_2$.

The effective compression method of the invention is beneficial for compression of gas and liquefaction of gases, both with and without turbines where the gas according to the device can be supplied pressurized and/or liquid.

BRIEF DESCRIPTION OF DRAWINGS

The invention will now be described in detail with reference to attached figures, where additional features and benefits of the invention are stated in the subsequent detailed description.

DETAILED DESCRIPTION OF THE INVENTION

Figure 1:
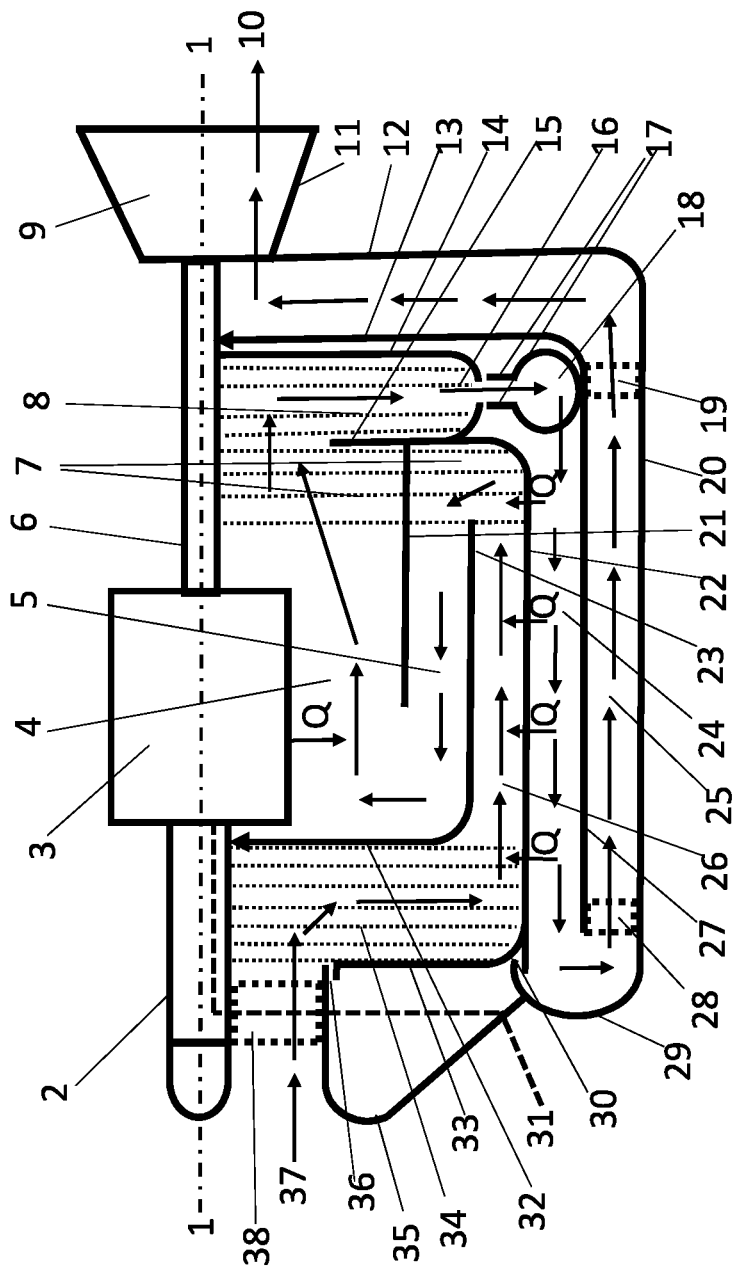
FIG. 1 depicts a principal embodiment of the invention, in which is shown a section along the axis of rotation and the shaft and one half of the rotational device and static devices; the other half being a mirror image of the half structure shown along of one side of the longitudinal axis, except symbols of static shaft, rotating shaft, motor and turbine that appear in full around the center axis.

FIG. 1 and according to the brief description of the figure displays a longitudinal section of the device with axis of rotation 1 enclosed with rotation device 3 to operate the rotating device. The rotation device 3 could be, for example, an electric motor that is docked and supported on one side with a hollow static shaft 2 like is docked and supported via a number of inlet stators 38 until inlet house 35 that does not rotate and may contain additional radial support (not shown). On the other end of the electric motor 3, the rotary shaft 6 is attached to a shovel wheel with inwards shovels 7 and outward shovels 8 equal to and with function like a centrifugal compressor, where shovels are illustrated with vertical dotted lines. The rotary shaft 6 is further connected to a turbine 9, which can be an axial turbine. On the rotary shaft 6 is it attached an outlet disc 14 attached to the rotary shaft 6 and to the radial exit shovels 8 branching outward towards the periphery to the outlet opening 16. Outward shovels 8 and inward shovels 7 are attached to each other in equal numbers and encloses the shaft at equal distance between them, where between outward shovels 8 and inward shovels 7 is attached to a center disc 15 with opening in center until outlet shovels 8. Center Disc 15 is further attached and centered at the periphery of a cylindrical heat-exchange tube 22 that encloses the axis of rotation in center with the same radius. On the other end of heat exchange tube 22 it is fixed inside one inlet disc 33 with holes in the middle for inlet 37 where the gas is transported for compression in the device, the flow direction of the gas is referred by thin arrows from the inlet, inside the device and through outlet 10 of the device after the turbine 9, except for thin arrows with Q referencing heat transfer. Inlet disc 33 in center is in a position of small clearance courage inner side of inlet house 35 to form an inner dynamic seal 36. To the inlet disc 33 it is attached an inlet vane wheel with radial inlet shovels 34, illustrated with vertical dotted lines, that are fitted forward bent in direction of rotation at inlet 37 opening by inlet stators 38. Inlet shovels 34 branching out from the static shaft 2 with little clearance and all the way to the periphery towards the inside of the heat exchange tube 22, where both inlet shovels 34 and the inlet disc 33 is centered and attached. It is advantageous if the number of inlet shovels 34, inward shovels 7 and outward shovels 8 is in an equal number and distance between them, by their cross section in the circumference around the axis 1. On the inlet shovels 34 inside there is attached an inlet inner disc 32 centered and supported by a bearing against the static shaft 2. Between inlet inner disc 32 forms radial channels from inlet 37 for transporting gas in the space between them, the inlet disc 33 and inlet shovels 34 radial outward towards the heat exchange tube 22. To form further axial outer channel 26 within the heat exchange tube 22 from the inside of the inlet shovels 34 to the inside of the inwards-shovels 7, it is to the periphery of inlet inner disc 32 fixed an outer tube 23 centered and enclosing axis 1. Outer tube 23 is placed centered against the inside of the inward shovels 7 and forming the outer channel 26 that are open both axial and tangential in the circumference of the outer channel 26 where the gas is transported. The gas is transported further inwards from the outer channel 26 via inwards shovel channel and radial inwards to middle channel 5 bounded by an inner tube 21 enclosing the axis 1 and are centered and attached to center disc 15 and inward shovels 7, centered within the outer tube 23. Inner Tube 21 is stretched towards the inlet inner disc 32 with an axial distance for opening between inlet inner disc 32 and inner tube 21 minimum equal to the width of inlet shovels 34 on the same radius. Inner Tube 21 thus forms an opening from the middle channel 5 and into the inner channel 4, where the gas picks up the surplus heat (Q) from motor 3 to avoid overheating. Furthermore, the gas is transported from center channel 4 through the inward shovels 7 and over to the outward shovels 8 where the gas during rotation is thrown outwards towards the outlet opening 16 on the periphery of the rotation device. The gas is being hurled and pressed from the outlet opening 16 and above until a static spiral diffusor 18 via and between two equal and Parallel diffusor discs 17 with equal diameter in circumference both at the periphery and on the inside. Diffusor discs 17 are attached to each side of the longitudinal opening on the inside of the spiral diffusor 18. Diffusor discs 17 with little clearance on either side of the rotation device's outlet opening 16 is to form a dynamic seal. The dynamic gas pressure from the outlet opening 16 is converted to an approximate static pressure in spiral diffusor 18 at a lower gas flow rate where both the pressure and the temperature in the gas increase. The spiral diffuser 18 is stretched throughout the circumference at the periphery of the diffusor discs 17. Diffusor channel starts with a small cross-sectional area (not shown) which successively increases towards the outlet of diffusor 18 as shown. The increasing cross-sectional area of the channel in spiral diffusor 18 has the same direction as the rotation and the gas will move from the end of it and into the static heat exchange channel 24 outside of the rotating heat exchanger tube 22 and within stator house tube 27. Heat exchange channel 24 is open in axial and tangential direction, where the gas out of spiral diffuser 18 is in a tangential spiral motion around and axial through heat exchange channel 24 at lower speed and in the same rotation direction as heat exchange tube 22. The heat (Q) from the gas in heat exchange channel 24 outside is transported into the colder gas within in the rotating outer channel 26 heated at high rotation of the rotary device. This higher pressure and temperature on the gas inward to center channel 4 and further higher temperature and pressure when Gas comes to heat exchange channel 24. After a number of heat exchange cycles, temperature quickly stabilizes. The hot gas from the heat exchange channel 24 will pass via outer house channel 25 up to the turbine 9, that via the rotary shaft 6 transfers more power to rotational device, than if the gas had been brought directly to the Turbine 9 from one compressor as explained later. Turbine House 11 is static, supported, and fixed on inlet until turbine disc 12, it is further attached to one end of the outer house tube 20 centered and enclosing the device. On the inner side of outer house tube 20, a number of stator inlets 28 and stator outlets 19 are attached at the beginning and end of the axial outer house channel 25 in gas flow direction. Where stator inlet 28 and stator outlet 19 in their separate places in the circumference can be in equal quantity that supports all static devices within the stator house tube 27 where diffuser 18 is attached to the inside at the end of the stator house tube 27, which also attaches to the periphery of the stator disc 13 that supports with bearing in center to the rotating shaft 6. The channel between the stator house channel 24 and outer house channel 25 arranged by dividing a circular pipe tangentially lengthwise to form a longitudinal semi-tube 29 customized and attaches to the the second end of the outer house tube 20 and semi-tube 29 outer edge of the pipe attaches to the inlet house 35 and thus all static parts are attached to each other and can support any static and rotating parts. Heat exchange tube 22 is towards the inlet side extended so that the semi-tube 29 may be in the position with little clearance against the inside of the heat exchange tube 22 extension, to form a outer dynamic seal 30 similar to the inlet disk dynamic seal 36. The distance between the semi-tube 29 and stator house tube 27 the opening must be arranged between them so that the gas speed is equal to or lower than the gas speed in the heat exchange channel 24 and the same for the outer channel 25 up to the turbine 9.

The turbine 9 must be adapted to maintain a favorable dynamic and static pressure and temperature between turbine 9 and diffuser 18 and at the same time have an optimal gas flow for the best possible regeneration from said energy loss and adapted to the speed during normal operation of the rotation device. To avoid heat loss and the best effect of the turbine, it is beneficial if the outer house tube 20 and the turbine disc 12 are heat-insulated (not shown).

Electric power cord 31 to electric motor 3 for rotation can be built through the inlet house 35, further through one of the inlet stators 38 at inlet 37 and onward through the hollow static shaft 2 to electric motor 3.

The purpose of the device and the procedure is thus that the gas in outer channel 26 has high rotation equal to the rotational device and has an approximate static pressure of the cold gas's column pressure in high centrifugal force from inlet 37 to the periphery of the outer channel 26. When the gas in the outer channel 26 is heated indirectly (Q) via the heat exchange tube 22 from the same gas in heat exchange channel 24 where $$\Delta T = \frac{v^2}{C_p},$$

which at first may be more than twice that of delta T in the gas in outer channel 26

$$\Delta T = \frac{v^2}{2C_p}.$$

(v=peripheral speed in m/s, when outlet opening 16 has the same radius as the heat exchange tube 22. Cp=the heat capacity of the gas). Delta T between them can be transferred (Q) to the colder gas in outer channel 26, thus giving it a lower density and lower centrifugal force on the warmer gas inwards towards center 4. Thus, the cold gas's column pressure from inlet 37 outwards will not be affected by the higher density heating, higher centrifugal force and will drive the lighter heated gas constantly from outer channel 26 towards center 4, during constant heating and constant speed. The greater the speed, the higher the temperature and the higher the pressure, both towards center 4, outlet opening 16 and after diffuser 18 and into the heat exchange channel 24. After a short time at constant flow and constant speed, the heat circulation and heat accumulation from the gas will stabilize to a constant temperature significantly higher than the first temperature in the outer channel 26. Thus, the heat accumulation and pressure increase in the gas can provide a significant additional work from the turbine 9, which contributes to significantly reducing the flow to electric motor 3 with equal suction or compression power. There is minimal rotation loss at constant speed of the rotation device because there is equal energy to put the gas in rotation out to the outer channel 26 as reducing the rotation of the gas by equal mass inwards towards center 4. All friction develops heat, and this energy is recycled to work from the turbine 9.

Gas outlet opening 16 and diffusor 18 can be placed radially further outwards than shown, for higher pressure and temperature, and the diffusor discs 17 can also have a larger diameter than shown and more space requires that heat exchange channel 24 and outer house channel 25 and up to turbine 9 must be designed for equal flow rate.

Figure 2:
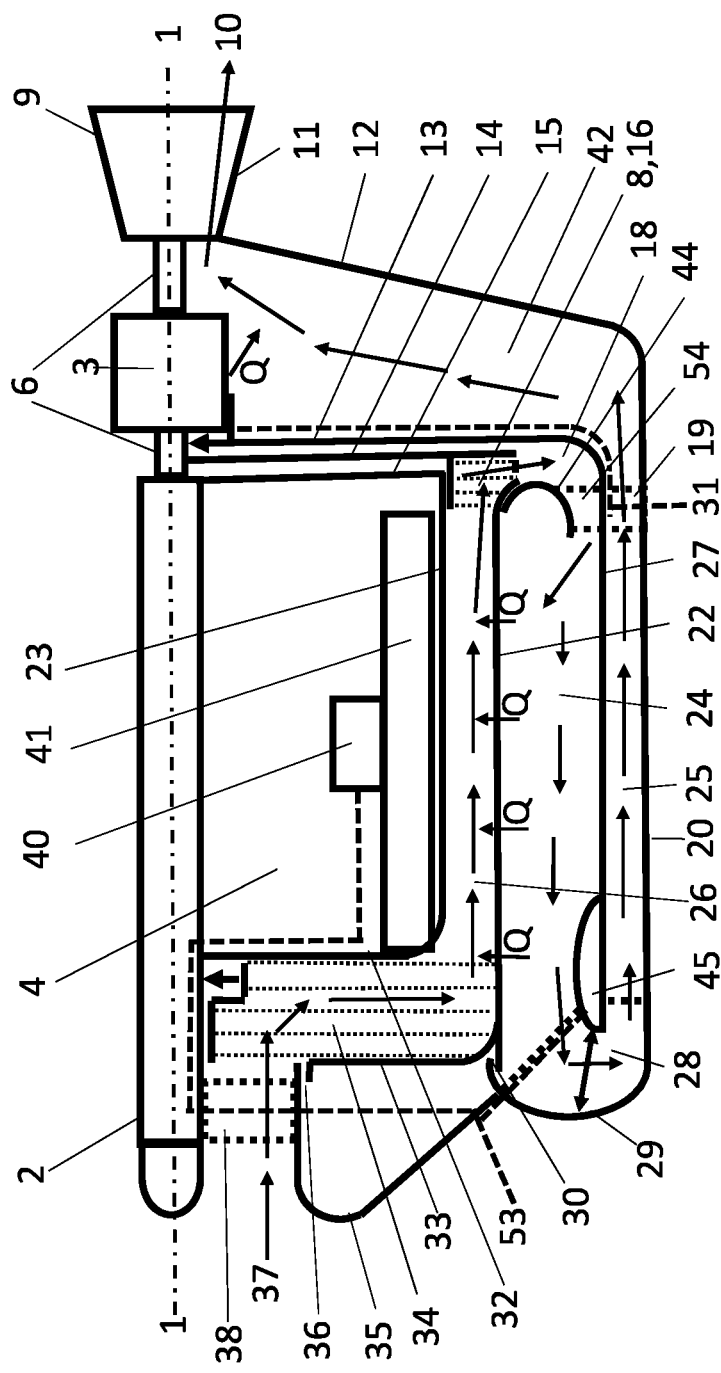
FIG. 2 depicts another principal embodiment of the invention shown in FIG. 1, in which is shown a section along the center axis and shaft and one half of the rotational device and static devices; the other half is a mirror image of the half structure shown longitudinally on one side of the longitudinal axis of rotation, except symbols of static shaft, rotary shaft, motor and turbine shown in full around the center axis.

On the other hand, the procedure and the device in FIG. 1 require that the gas in inlet 37 is as clean and free of particles as possible, as this will be deposited against the heat exchange tube 22, which at high speed can deposit particles as small as viruses or smoke particles. FIG. 2 shows a procedure and device that solves this deposit challenge and can be mounted in front of the device and procedure described in FIG. 1.

FIG. 2 shows a different embodiment of FIG. 1, where FIG. 2 displays in the same way a longitudinal incision of the device with the center axis of rotation 1 enclosing a rotational device that can be an electric motor 3 to operate the rotating device via the shaft 6. Electric motor 3 is docked and supported to stator disc 13 which also provides bearing support to the rotary shaft 6 in the center and on the same side of the electric motor 3 where outlet disc 14 is fastened to the shaft 6 for transfer of rotation to the rotation device. The rotary shaft 6 is further supported by bearing inside one side of a hollow static shaft 2 which is anchored via inlet stators 38 at inlet 37 to inlet house 35 that do not rotate and may contain additional radial support means (not shown) for further support. On electric motor 3 on the other side, the rotary shaft 6 is attached through motor 3 to rotary shaft 6 and attached to a turbine 9, which can be an axial turbine. To the rotary shaft 6 the center disc 15 is centered and attached to transfer rotation from the rotation device 3 and at the same time it is supported. On the outlet disc 14 inside it is on the periphery attached radial outward shovels 8 shown as vertical dotted lines and branching outward towards the periphery. Outward shovels 8 are centered in the area and encloses the shaft evenly between them and they can on the inside be attached to a tube that is further centered and attached to the outlet disc 14 for supporting the outlet shovels 8. On the periphery of outward shovels 8 it is one longitudinal outlet opening 16 in the perimeter against a circular diffuser 18 enclosing the outlet opening 16 in the circumference of it. Towards the periphery of the outlet shovels 8 they are attached and centered at periphery to the inside of the cylindrical heat exchange tube 22 from the other side of the outlet opening 16. Heat exchange tube 22 encloses the axis of rotation in the center by an equal radius. On the opposite end the heat exchange tube 22 is attached to the inlet disc 33 with holes in the middle for inlet stators 38 where gas is transported for compression in the device. The flow direction of the gas is shown with arrows from the inlet, inside the device and through the outlet 10 out of the device after the turbine 9, except for thin arrows with Q referring to heat transfer. Inlet disc 33 in the centre is located with little clearance against the inside of the inlet house 35 to form a dynamic seal 36. To the inlet disc 33, radial inlet shovels 34 are attached, shown as vertical dotted lines and forward bent in the direction of rotation at the inlet 37 opening within inlet stators 38. Inlet shovels 34 are supported in the center to the static shaft 2 to support the rotary device and make it rotatable. Inlet shovels 34 branch itself outwards towards the periphery from the bearing in the center and with little clearance against static shaft 2. Where inlet shovels 34 extends all the way to the periphery against the inside of the heat exchange tube 22, where both inlet shovels 34 and the inlet disc 33 is centered and attached. It is advantageous if the number of inlet shovels 34 and outward shovels 8 is in an equal quantity. Within inlet shovels 34 inside it is small clearance against one inlet inner disc 32 which is a stator disc that is centered and attached to the static shaft 2. The space between stator inlet inner disc 32, the inlet disc 33 and inlet shovels 34 radially outwards towards the heat exchange tube 22 forms impeller with radial gas ducts from inlet 37 to periphery to the inside of the heat exchange tube 22 that may resemble a centrifugal compressor with radial straightening or backward bent inlet shovels 34 outward to periphery. To further form an axial outer channel 26 within the heat exchange tube 22 from the periphery of inlet shovels 34 to outward shovels 8 it is fixed and centered to periphery of stator inlet inner disc 32 an outer tube 23 that enclosed axis 1. Outer tube 23 is centered and attached to the other end's inner side to the outside of a centered outlet static center disc 15 or a static center disc, which is further in center attached to the end of the static shaft 2 and forms within a center channel 4 that has the shape of a cylinder outside of the static shaft 2 between stator inlet inner disc 32, outer tube 23 and exit stator disc 15. The outside of outer tube 23 has little clearance to the inside of the outlet shovels 8. There is also little clearance between stator center disc 15 and the rotating outlet disc 14. The room between the heat exchange tube 22 and outer tube 23 is thus open both axial and tangential in the circumference of the outer channel 26, as a centered cylindrical duct around axis of rotation 1 between inlet shovels 34 and outlet shovels 8, where the gas is pressed axial to outward shovels 8 that slings and presses gas outwards from the rotary device's outlet opening 16 and over to a static diffuser 18. Along the inside of the outer tube 23 from stator inlet inner disc 32 and aligned with the inside of the outlet shovels 8, a series of brush housings 41 have been laid out axial with axis of rotation 1 and positioned at an equal distance on the inside of the outer tube 23 with opening to the outer channel 26 outside each brush housing 41.

The number of brush housing 41 must either be higher or lower than the number of inlet shovels 34 and outward shovels 8 that may have an equal number. Inside each brush housing 41 a longitudinal brush (not shown) for the entire length on the inside of the brush housing 41 is attached to the ends of the supportive gliders (not shown). On top in radius within each brush housing 41 there is attached a spring-loaded magnetic brush relay 40 which is further affixed with an axial moveable relay shaft for the brush in the brush housing 41. When powered is on in power cord 31 to brush relay 40, will relay Axle from each relay pushing each brush radially outwards and in contact with the inside of the heat exchange tube 22, the brushes will both stop the rotation of the gas. The gas is then only sent axially between the brushes at high speed together with sediments that the brushes have swirled up (more details in FIG. 3). The gas from outlet opening 16 to the diffuser 18 likewise does not rotate similarly to FIG. 1, but the implementation in FIG. 2 shows a different embodiment, in which diffuser 18 is arranged in the room between the stator disc 13 on one side of the outlet opening 16 and on the other side can be a longitudinal pipe encircling the outside of the heat exchange tube 22 with little clearance at the outlet 16. In FIG. 2, the aforementioned longitudinal inner diffuser wall 44 around the rotor shown as a circular pipe divided in half lengthwise. Inner diffuser wall 44 are in the periphery supported and attached to a variety of diffusor stators 54, which is arranged close to an angle parallel to the direction of the discharge gas from diffuser 18 to the heat exchange channel 24 between the rotor heat exchanger tube 22 and stator house tube 27 forming a cylindrical and axial open heat exchange channel 24 enclosing the rotor. The stator house tube 27 inside supports and fastens diffusor stator 54. The gas from diffuser 18 and through the heat exchange channel 24 will form a helical movement and in the same direction of rotation as device rotation, but with lower speed than the peripheral speed of the heat exchange tube 22. This relative movement between the heat exchange tube 22 gas in the heat exchange channel 24 gives a relatively high active contact area for the gas on the outside of the heat exchange tube 22.

This in turn results in a higher heat transfer (Q) through the heat exchange tube 22 from the warmer gas in the heat exchange channel 24 and into the gas in the outer channel 26 with higher capacity than if heat exchange tube 22 is not rotating. The high centrifugal force from rotation will also result in greater buoyancy force inwards for the heated gas with lower density in outer channel 26 from the inside of the heat exchange tube 22 and the heat is transferred significantly faster in the gas inside the outer channel 26 compared to if it didn't rotate. The same thing happens, too, in the gas with rotating spiral motion through the heat exchange channel 24, however, with less force of lower rotation and vice versa by cooling the gas in the heat exchange channel 24 which results in higher density and the cold gas is thrown outwards, resulting in a faster temperature mix, but also because the gas speed in the heat exchange channel 24 differs from the heat exchange tube 22 and stator house tube 22. This creates turbulence that also improves the mix. Then the gas in the outer channel 26 eventually achieves a constantly higher temperature during constant rotation, the colder gas from inlet 37 to heat exchange tube 22 will give a higher pressure in the hot gas towards the outlet opening 16 compared to it was heated from the inlet. This means that the outlet speed of the warmer gas from the outlet opening 16 will be able to achieve higher radial speed than the periphery rate at outlet 16. This causes higher pressure and higher temperature through diffuser 18 and into the heat exchange channel 24. After heat exchange at equal pressure after the heat exchange channel 24, the gas will have a higher temperature and pressure than if that Gas only had passed through a standard centrifugal compressor with equal peripheral speed. The gas is directed after the heat exchange channel 24 outwards to the outer house channel 25 and onwards via the motor duct 42 where the gas draws excess heat Q from the motor and the pressurized gas is further heated before being routed through the turbine 9 that regenerates the energy of the pressure and heat loss from the gas and provides work from the turbine 9 transmitted via the rotary shaft 6 to electric motor so that the current in power cord can be reduced and yet maintain equal power to rotating the device through the shaft 6. The turbine house 11 is static and fixed outside the inlet of the turbine disc 12, it is further attached to the outer house tube 20 that is centered and encloses the device and on the inner side, and where there is attached a number of stators 19, 28 shown between dotted lines and with equal distance in the perimeter of the beginning 28 and the end 19 of the axial outer house channel 25 in the direction of gas flow. Afore mentioned stators 19, 28 supports the stator house tube 27 which is attached to the stator disc 13 which attaches to motor 3 and further supports with bearing the shaft 6. The channel between heat exchange channel 24 and outer house channel 25 is arranged by dividing a circular pipe tangentially lengthwise to form a longitudinal semi-tube 29 that is attached to the end of the outer house tube 20 and attached to the inlet shovel 34 supported by stators 28 starting in alignment with the semi-tube 29 and thus all static parts are attached to each other and can support both static and rotating parts. The heat exchange tube 22 is extended towards the outer dynamic seal 30 at the inlet side so that the semi-tube 29 can be positioned with little clearance towards the inside of the extension of the heat exchange tube 22, to form a dynamic sealing similar to that of the inlet disc 33, where this can be labyrinth seals. The distance between the semi-tube 29 and the stator house tube 27 must be arranged so that the gas speed is equal to or lower than the gas speed in the heat exchange channel 24. The turbine 9 must be adapted to maintain a favorable dynamic and static pressure and temperature between turbine 9 and diffuser 18 and also so that the static pressure in diffuser 18 does not build up towards the outlet opening 16 in the rotor, so that the gas flow there does not decrease or stop.

Electric power cord 31 to electric motor 3 for rotation can be built through the outer house tube 20, further through one of the stator outlets 19 at the inlet to the motor channel and further on the outside of the stator disc 13 in the motor duct 42 up to motor 3.

Power to relay 53 to brush relay 40 housing can be led through the inlet house 35, further inwards through one of the inlet stators 38 at inlet 37, into the cavity of the static shaft 2 and further inwards into its cavity, where it is led through the static shaft 2 into the center channel 4 and branches outwards and into contact with all brush relays 40.

On the inside of each stator 28 at the end of the stator house tube 27 a spring-loaded electric relay named stator relay 45 that has two axial-moving shafts, each of which is attached to the end of two outlet hatches on each side of the stator 28 towards the inner side of the semi-tube 29, where each outlet hatch is between stators 28. (more details are explained in FIG. 3). Electric current to stator relay 45 on the stator house tube 27 is branched to each brush relay 40 led from power to relay 53 outside the inlet house 35 through the semi-tube 29 wall, further through each stator 28 which can be hollow and connected to its own stator relay 45. The brush relays 40 and the stator relays 45 are activated at the same time and can be connected to a single switch on the power to relay 53 cords.

Figure 3:
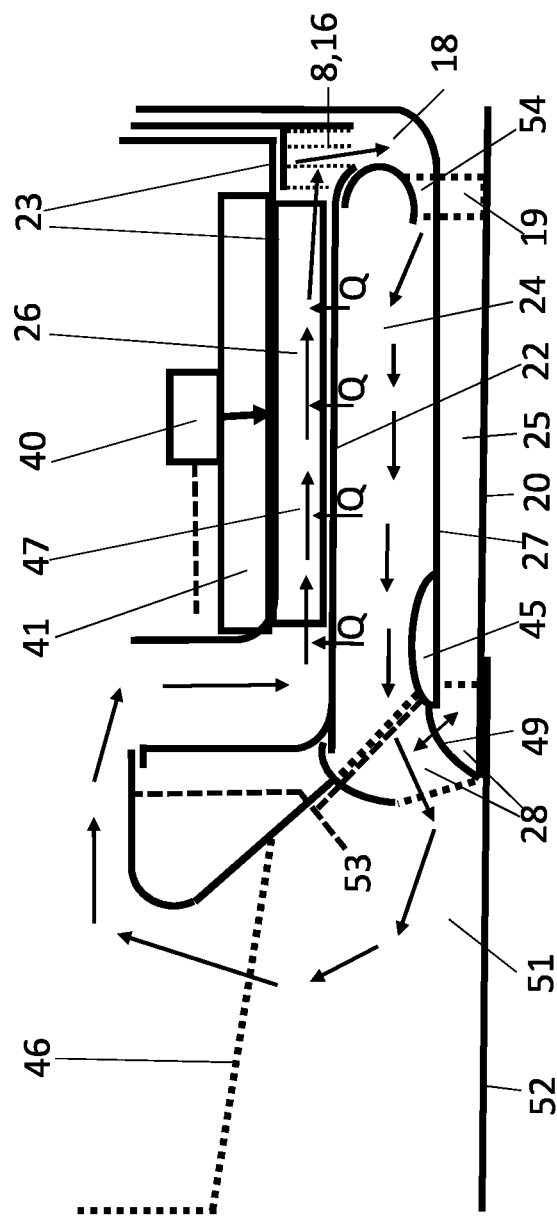
FIG. 3 depicts a detail of the embodiment of the invention shown in FIG. 2, which shows detailed mechanisms for the removal of accumulated particles from the rotational device and out of it.

FIG. 3 shows a cutout of FIG. 2 with further description of the device when brushes 47 to loosen particles and outlet relay hatches 49 are active. FIG. 3 also shows one side of inlet coarse filter 46 and cyclone house 52. In the inlet coarse filter 46 that encloses the inlet and is attached to the inlet housing at a favorable radius. Cyclone house 52 is attached to the outer side of the outer house tube 20 and encloses and seals around the device. During normal operation, the gas will enter tangentially via a device (not shown) attached to the inside of the other end of cyclone house 52, thus coarse particles will be thrown outwards towards cyclone house 52 from the rotation and the tangential movement of the gas into cyclone house 51. The inlet coarse filter 46 captures any coarse particles from the gas, before it is sucked further through the inlet and compressed into the outer channel 26 in high centrifugal force in the rotating device. Particles that pass the inlet coarse filter 46 and which are carried with the gas, will be hurled quickly outwards and deposited towards the inside of the heat exchange tube 22, depending on the centrifugal force and the length of the outer channel 26 it is thus possible to capture even the smallest particles such as viruses and smoke. Therefore, additional fine filters such as the HEPA filter can be excluded on the gas out of the device. This will also improve the flow of gas and reduces both losses and the supply of electricity to the motor. At regular intervals, the deposit against the heat exchange tube 22 must be removed by supplying electrical power to relays 53, which simultaneously activates each electromagnet in each brush relay 40 housing and stator relay 45 at the same time, where the axial shaft from each brush relay 40 housing with its own electromagnet pushes each shaft with connected brush 47 radial outwards to the outer channel, where the brush 47 comes into contact with the inside of the heat exchange tube 22.

The brushes 47 are parallel to the axis of rotation in the entire axial length of the outer channel 26 from the inside to the inlet shovels 34 and outlet shovels 8 with little clearance inside the rotation device. The purpose of brushes 47 is both to swirl up the deposit of particles from the inside of the heat exchange tube 22 and at the same time stop the rotation of the gas in the outer channel 26, where the gas will then transport the swirled particles axially in the outer channel 26, further via the rotor's outlet opening 16 over to the static diffuser 18 and further between and parallel to the slanted diffusor stators 54, further through the heat exchange channel 24 and out to cyclone room 51, where stator relays 45 has opened its relay hatches 49 which are outlet hatches, where the gas with the particles is directed out to cyclone room 51, where the particles are delivered. At the same time, the relay hatches 49 close completely for the gas to pass into the outer house channel 25 parallel to stators 28, 19 and onwards as mentioned in FIG. 2 for the turbine and out of the device.

This resumes once the rapid particle cleaning is completed and clean gas is left in the heat exchange channel 24, after which relay hatches 49 closes and seals out to cyclone room 51, while opening the outer house channel 25 and brushes 47 are retracted in the brush housing 41 again when the power to all the relays is off at the same time. The relay hatches 49 are on the periphery attached to the outer house tube 20 with flexible hinges that simultaneously clog, and the hinges can be made of rubber. The relay hatches 49 can also have rubber lips attached along the outer edges for better sealing with outward shovels 8 and towards the stator house tube 27 when they are open for particle cleaning and also against the half pipe when relay hatches 49 are closed against cyclone room 51.

Each stator relay 45 has two axial-moving flexible shafts arranged on either side of each stator 28 and flexibly attached to the end tangentially on each relay hatch 49 in the perimeter. Also, each relay hatch 49 is attached at the end via the relay shaft to each stator relay 45 and where all are activated at the same time. Stator relays 45 are spring-loaded so that they push them to closed position against cyclone room 51 during normal operation and open to cyclone room 51 when the relays have pressed power to relay 53 under the particle removal from the outer channel 26. The same is also true for brush relays 40, but where the spring load in brush relays 40 is adapted to keep the brushes 47 inside the brush housing 41 during normal operation and the brushes are pushed outwards by pressing power to relay 53 for particle cleaning. The brush housings 41 are fastened at an equal distance around towards the inside of the outer tube 23. To reduce turbulence in outer channel 26 during normal operation, there may also be a hinged hatch outside each brush (not shown), the hatch may be hinged up to one side of the brush housing's 41 brush opening or to the outer tube 23, so that it opens and swings towards the direction of rotation (not shown) when the brushes 47 are pushed outwards. When brushes 47 are pulled back into their brush housings 41, the hatch will close, both by the rotational force of the gas and by a spring attached to it and on the ends of each brush 47 and hatch (not shown). Each brush 47 is supported with a sliding rail at each end, adapted to withstand the forces it is subjected to. The speed of the rotary device may also be adapted to a favorable speed to avoid oversizing the supporting devices during the particle cleaning process.

On the other hand, the aforementioned hatches (not shown) outside the brush hinge can be raised outside the brush housing 41 to the outer tube 23 and also act as brushes 47, in that brushes can be built along the edge of the hatch that moves outwards towards the heat exchanger tube 22 and these brush hatches can be attached to each brush relay 40 attached to the inner side of the outer tube 23 and thus both the aforementioned brush housing 41 and its own brushes 47 are avoided. When closed and not in use, the brush hatches can also be folded into the outer tube 23 (not shown), so that they are aligned with the circle of the outer tube 23 to improve the dynamic gas flow through the outer channel 26.

Figure 4:
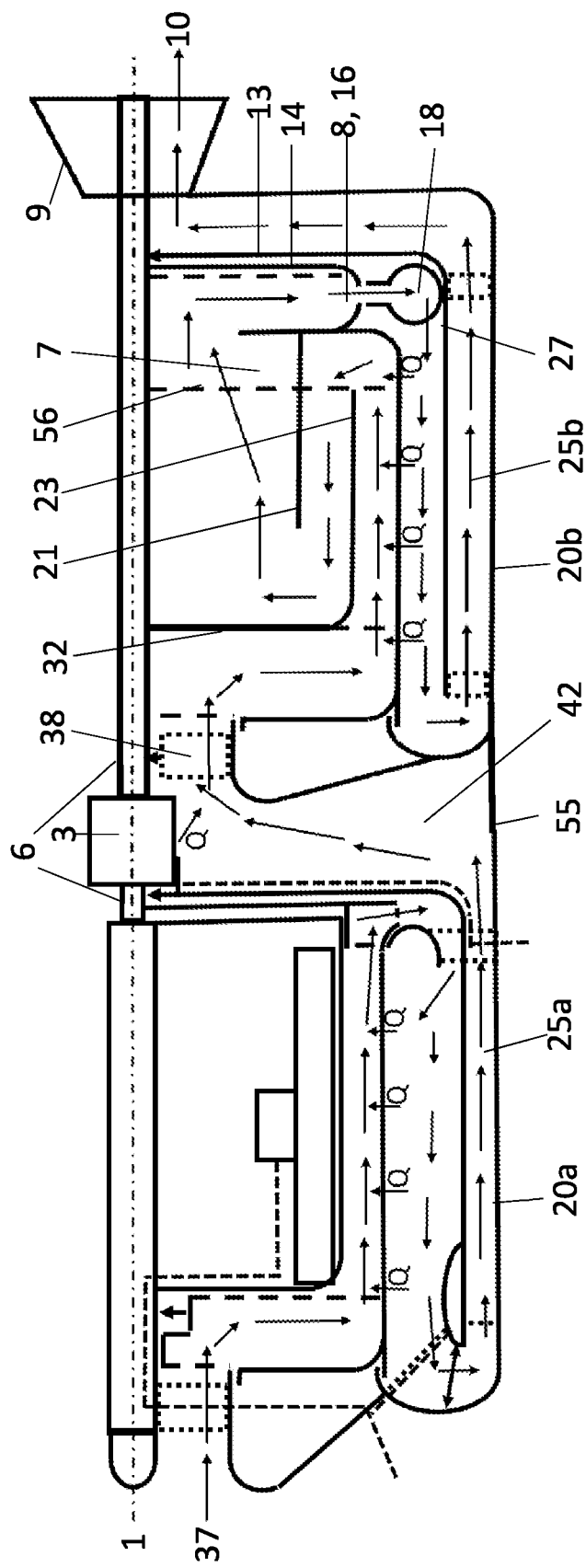
FIG. 4 depicts a detail of the invention in FIG. 1 and FIG. 2, where the first embodiment in FIG. 2 is connected in front of the embodiment of FIG. 1 to form a serial connection.

FIG. 4 shows the workmanship in FIG. 2 juxtaposed with the device in FIG. 1 mounted according to FIG. 2, where they have in common: axis of rotation 1, motor 3, rotary shaft 6, turbine 9. They are fastened together from each extended outer house tube 20a, 20b and the outer house coupling 55 can be with a pipe coupling that envelops and centers the new assembled device and forms the motor duct 42 that directs gas from the first device from FIG. 2 to the inlet of the second device from FIG. 1 which results in higher pressure and temperature in the gas before the turbine 9. The second device has slightly altered working order as shown from FIG. 1, where the rotary shaft 6 is attached to the rotation shaft of the first rotational device on the other side of motor 3 and the rotary shaft 6 extended through motor 3 and further attached to a joint turbine 9.

The rotary shaft 6 within the second rotary device is made up and supported in the center of inlet stators 38 and in the center of the outlet stator disc 13 from the first and second devices. For rotation of second ration device, it is further attached to the shaft of the inner inlet disc 32 and outlet disc 14. Motor 3 is located outside the inlet, otherwise the second device is the same as described in FIG. 1.

On the other hand, the current working form in the second rotational device, when motor 3 is located outside, can advantageously be changed by removing the inner tube 21 and instead attach and centered a center shovel disc 56 against the rotary shaft 6 and further attached to the inner side of the inward shovels 7 and on the periphery of the center shovel disc 56 is attached to outer tube 23 and the device can now direct the gas radially straight inwards towards the center of the channels between the inward shovels 7. If outlet opening 16 and diffuser 18 are placed closer to the center than shown, it is mainly the temperature increase that results in higher pressure inwards and towards the outlet opening 16. This can be advantageous if extra heat is added. On the other hand, the outlet opening 16 from the device and diffuser 18 can be placed in any radius from the center outwards. Outlet opening 16 and diffuser 18 can be placed from radially outside the heat exchange pipe as shown and described in FIG. 2 and to axial outlet over to axial diffuser (not shown) in a custom radius depending on the heat supply. When using a spiral diffuser 18, which is narrower at the beginning, it can be supported (not shown) from the beginning with custom struts attached to the stator house tube 27 and/or against the stator disc 13.

Apart from the current common turbine, the first device in FIG. 4 is similar to and described in FIG. 2, with gas inlet 37, where the direction of flow of the gas is relegated with thin arrows, the same as described for previous figures and the gas is transported through the new assembly up to the outlet 10 after the turbine 9 where there will still be some heat in the gas if the device around the outer house tubes 20a and 20b is heat insulated.

The heat from the gas in the outer house channel 25a, 25b can be routed radially out (Q) through the outer house tubes 20a, 20b or by other means. For example, the heat can be supplied to the indoor air for heating and/or other fluid that may be heated, the more heat emitting from the gas in the outer house channel 25a, 25b, the colder the gas will go through the outlet 10 after the pressure drop through the turbine's 9 Juel-Thomson similar nozzle. This method thus provides an efficient single-gas phase heat pump with combined air purifier and air conditioning for either heating or cooling the indoor air and simultaneous particle capture with periodic particle cleaning is mentioned in the description of FIG. 3. But instead of particle accumulation in the cyclone housing, the particles in this case can be led in a separate channel to the air outside the building (not shown). An airduct must also be built (not shown) to and from the device to the outdoor environment for transporting any heat or cold from the assembled device when used as air conditioning which in case of cold and clean air to the room comes from outlet 10 and the heat from outer house tubes 20a, 20b is directed outside the building and vice versa when the room should be heated with the device. If the device is insulated at the outer house tubes 20a, 20b, and cleaned hot air out of the device with a custom turbine 9 can deliver the purified hot air from outlet 10, directly to the room without outdoor air channels to and from the device, but only the particle cleaning channel to outside the building from the device.

Multiple devices can be connected in a series, more than the two shown and described in FIG. 4, with a custom motor 3 and rotary shaft 6 for each series of couplings. Several series connectors can be placed parallel (not shown), where the outlet from a series is connected to the inlet of the next series, etc. Where both the pressure and temperature of the gas increase after each series if the turbine 9 is reduced in size and/or is connected only to the rotary shaft 6 after the last series in the parallel coupling on the same shaft before outlet and at custom pressure, the electric motor can be avoided if the turbine 9 provides enough energy for rotation on the same shaft/series, which can also be connected to a generator to supply some of the electric current to one or more of the other custom motors in its series ahead of the last series.

On the other hand, the device in one or more series as mentioned, can deliver a gas compressed to high pressure. Then the gas inlet of the first device may be attached and sealed to an adapted duct for transporting the gas (not shown) to the device in the series. When compressing between each device, the heat (Q) from the compression is extracted at each outer house tubes 20a, 20b and so on to increase the pressure between each device in each series and from one series to the next, while utilizing the heat outlet. After the last device in the chain, the turbine 9 can be reduced or removed and replaced with a custom duct (not shown) that is attached and seals around the outlet of the last series so that the fully compressed gas at high pressure can be transported on to storage or use. As regeneration-work from turbine 9 is missed in this case, larger motor 3 must be adapted, but with less power consumption than other known compression methods.

On the other hand, if the gas is cooled so much, with means at the outer house tubes 20a, 20b in a series, and that the gas before outlet 10 is close to critical temperature and pressure, the device may have an adapted turbine 9 where the gas condenses after the turbine 9 of the adiabatic-like pressure drop through, and further enables a reasonable liquefaction of the gas. If a gas mixture enters inlet 37, the gases can be condensed in order of critical temperature and pressure during the series of customized turbine 9 for this at the end of one or more series. In other words, several gases can be separated and transported away in their own channel at their own turbines (not shown), for example, a gas mixture where water vapor is condensed only after its turbine, then $CO_2$ and finally Hydrogen with expansion over nickel catalyst to Para condition. Where then the outer house pipes in the series between each turbine 9 are cooled by means to cool the gas in the outer house tubes 20a, 20b.

On the other hand, and when the inlet gas contains oxygen, in the last device in a series, a fuel can be added in a custom quantity (not shown) in the form of gas or liquid via one or more nozzles with means for transporting the fuel to the nozzles on the periphery of an adapted combined diffuser and combustion chamber according to the rotation device. This may be advantageous at the beginning of the spiral diffuser where there is the least cross-sectional area, where even after the fuel nozzle in the gas-flow direction, an ignition mechanism is established that can be an adapted spark plug with means to provide electricity to it from the outer side of the device. The ignition mechanism is only for ignition of the fuel (not shown) at first, when the gas has started combustion, it is maintained. The hot gas from the compression and combustion moves from the now combined diffuser and combustion chamber into the aforementioned heat exchange channel and emits heat (Q) via the heat exchange pipe and into the gas in the outer channel of the rotary device, which heats up under constant pressure.

The heated gas is pressed further by the cold inlet gas and thrown and pressed at a much higher speed than the peripheral speed in the outlet opening in the rotary device and over to the diffusor where the higher speed of the warmer gas results in higher pressure and temperature in the diffusor/combustion chamber before heating/combustion and fuel can be reduced for an adapted temperature of the gas from the diffusor and further through channels to the turbine. At proper and low amount of fuel, it can power the rotary device compressors by itself and without electric motor power. With more fuel, this gives more work than the compression work and the device become a combustion engine.

This surplus work can be used in several ways which can be through the electric motor 3 which can be adapted for a combined electric motor/generator or a custom generator and produce electrical power supplied via said cables to electric motor and in this case the generator and out of the device which can now resemble a gas turbine with generator. In the case of more fuel, the turbine can also be adapted for precisely and drive the rotation device and overlook the pressure after the turbine via a nozzle provides thrust as in a jet engine, but with the device far less fuel consumption by equal thrust, the same with larger turbine without thrust as for gas turbine with generator.

In the case of the above-mentioned combustion engine and gas turbine generator case, the devices may have a closed-circuit channel from outlet to inlet in one or with several in series, where the series with closed circuit channel can contain a favorable working gas that can be $CO_2$ adapted to a near-critical high pressure, which is also adapted to the series. The temperature in the circuit must be above or just above the critical temperature to avoid condensation of the working gas. In case of said fuel nozzle in the diffusor/combustion chamber and in front of the ignition mechanism, it is laid out after the fuel nozzle or each fuel nozzle another or several nozzles (not shown) with means for supplying oxygen in the adapted amount for stoichiometric combustion of the simultaneously supplied Fuel. The exhaust will continue after the turbine in the outer closed circuit/channel between the outlet of the series and to the inlet of the series, a cooling device (not shown) is inserted inside the outer circuit channel to cool the gas and only to a temperature, most of the water vapor from the combustion is condensed out at the high pressure.

The water is collected in a water collection chamber on the low-side of the outer circuit, where the condensed water is further pressed from the bottom of the water collection chamber and out via channels (not shown) from the closed $CO_2$ circuit. After the water condensation area in the outer circuit channel a dedicated channel is connected that directs some $CO_2$ to a cooling chamber that under the high pressure and with cooling in the cooling chamber condenses out the extra $CO_2$ from the combustion, and the $CO_2$ rich gas during condensation continuously, the channel of the condensation chamber adapted to condense out $CO_2$ in a custom quantity will be drawn in order to maintain a constant pressure in the closed $CO_2$ circuit. The liquid $CO_2$ is pressed further from the bottom of the cooling chamber and out (not shown) for further utilization or storage and disposal, as well as some $CO_2$ is stored to balance the pressure in the external closed circuit and relies on the operating mode of the devices in the series from stop to full operation that will draw more gas from the outer circuit and into the rotation devices in the series. The aforementioned $CO_2$ capture channel may contain a compressor that compresses the $CO_2$ gas into the cooling chamber so that $CO_2$ can condense if the pressure in the outer circuit is too low to achieve condensation in its cooling chamber.

$O_2$ for combustion or for other purposes can, as mentioned earlier, be carried out with another series of rotary devices that retrieve $O_2$ from the air, by cooling the air between each compression stage, mentioned earlier with means through the outer house pipes of the devices in the series. After the last device with a custom turbine, $O_2$ will condense before $N_2$, which does not condense. The condensed and liquid $O_2$ gas is collected in a chamber and directed from the bottom of the chamber via channel out (not shown). The cold residual gases from the air and $O_2$ in its channel are heated by cooling the air inside one or more of its devices via outer house pipes. $O_2$ is further led as mentioned for combustion together with the fuel in the diffuser combustion chamber in the aforementioned engine device or some is stored compressed or liquid in the adapted tank.

The aforementioned $CO_2$ device with a closed circuit can also heat the gas after the last device in the series before the turbine over its outer house tube 20b or via means for heating the gas from the excess heat that would otherwise have been lost. The heating of the gas can also come from solar heat or a heat source, or the device can be combined with these heat inputs and combustion as needed.

Electric motor/generator 3 can also be placed in front of inlet 37 to the first rotary device in a series and with means for electricity and with opening for the inlet. It can be fixed with struts/stators to the inlet housing or electric motor is attached to the static shaft adapted for space for the rotary shaft 6 which is extended from the motor/generator and all the way around the axis of rotation up to the turbine 9. The rotary shaft 6 has bearings and is attached to the rotation devices as mentioned earlier.

The listed parts of the rotary device may be in a material that has the necessary strength at high pressure, rpm, heat and can be a custom metal for this. The heat exchange pipe through which heat is to be transported is an advantage if it has high heat transport capacity and can be of a reinforced aluminum alloy, graphene or another heat conducting material. The pressure outside the heat exchange pipe is higher than the pressure inside the outer channel, thus it can be adapted to a very thin heat exchange tube that is adapted to float on the outside pressure during normal operation and high speed.

For parts of the static device, the temperature and pressure of which allows it to be made of plastic. At higher temperatures and pressures, materials that can withstand this and can be made of metal or one or more composite materials must be used. If heat is to be emitted over the outer house pipe, it is an advantage that the material there has good heat conduction properties, as well as that it must be dimensioned to withstand both high pressure and heat as mentioned for the internal combustion engine and device with closed $CO_2$ circuit in the last device in a series of devices.

It is advantageous if the stator house tube 27 is insulated or hollow to reduce heat transport out to the outer house channel 25.

The figures show the principles of design and not the real construction.

|    | Nomenclature to figures in current patents | Rotates | Static |
|----|---------------------------------------------|---------|--------|
| 1  | Axis of Rotation                            | X       | X      |
| 2  | Static Shaft                                |         | X      |
| 3  | Rotation device (Motor)                     | X       |        |
| 4  | Center channel                              |         | X      |
| 5  | Middle channel,                             | X       |        |
| 6  | Rotary Shaft                                | X       |        |
| 7  | Inward shovels                              | X       |        |
| 8  | Outward shovels                             | X       |        |
| 9  | Turbine                                     | X       |        |
| 10 | Outlet (from the device)                    |         | X      |
| 11 | Turbine house                               |         | X      |

-continued

| | Nomenclature to figures in current patents | Rotates | Static |
|---|---|---|---|
| 12 | The turbine disc | | X |
| 13 | Stator disc at outlet | | X |
| 14 | Outlet disc | X | |
| 15 | Center disc | FIG. 1 | FIG. 2 |
| 16 | Outlet opening | X | |
| 17 | Diffusor discs | | X |
| 18 | Diffusor | | X |
| 19 | Stator at the end of the outer house canal | | X |
| 20 | Outer house tube | | X |
| 21 | Inner tube | X | |
| 22 | Heat exchange tube | X | |
| 23 | Outer tube | FIG. 1 | FIG. 2 |
| 24 | Heat exchange channel | | X |
| 25 | Outer house channel | | X |
| 26 | Outer channel | X | |
| 27 | Stator house tube | | X |
| 28 | Stator inlet (outer house channel) | | X |
| 29 | Semi-tube | | X |
| 30 | Outer dynamic seal | X | X |
| 31 | Power cord (to rotation device or from generator) | | X |
| 32 | Inlet inner disc | FIG. 1 | FIG. 2 |
| 33 | Inlet disc | X | |
| 34 | Inlet shovels | X | |
| 35 | Inlet house | | X |
| 36 | Dynamic seal | X | X |
| 37 | Inlet | X | X |
| 38 | Inlet stators | | X |
| 40 | Brush relay | | X |
| 41 | Brush housing | | X |
| 42 | Motor duct | | X |
| 44 | Inner diffuser wall (as a half-pipe) | | X |
| 45 | Stator relay | | X |
| 46 | Inlet coarse filter | | X |
| 47 | Brush | | X |
| 49 | Relay hatch | | X |
| 51 | Cyclone room | X | |
| 52 | Cyclone house | | X |
| 53 | Power to relays | | X |
| 54 | Diffusor stator | | X |
| 55 | Outer housing coupling | | X |
| 56 | Center shovel disc | X | |

The invention claimed is:

1. A device to produce higher pressure and temperature in a gas, the device including
a rotation device adapted to rotate a shaft,
an inlet for gas, and
at least one shovel wheel with shovels designed to drive the gas from the inlet through an axial outer channel, an intermediate channel, an inner channel and an outlet to a diffusor, and further through a heat exchange channel that runs parallel to and in contact with the outer channel for transferring heat from the heat exchange channel to the outer channel, the gas being driven on to an outer-house channel that leads the gas to an outlet or to a turbine connected to the rotary shaft and on to the outlet.

2. The device according to claim 1, where the outlet and diffusor are located at a periphery of the device or closer to the center depending on the desired temperature of the gas supplied at the outlet.

3. The device according to claim 1, including a shovel wheel with inlet shovels located at the inlet and in front of the outer channel, a shovel wheel inward shovels located between the outer channel in front of the middle channel and after the inner channel, and/or a radial shovel wheel with outlet shovels located between an outlet of the shovel wheel with inward-shovels and the diffuser.

4. The device according to claim 1, further including one or more fuel nozzles placed in the diffusor designed for the supply of fuel, and an ignition mechanism for the fuel located after the fuel nozzles in the flow direction of the gas.

5. The device according to claim 4, further including one or more oxygen nozzles oriented for the supply of oxygen, in which the oxygen nozzles are located after each fuel nozzle and in front of the ignition mechanism in the direction of flow of the gas.

6. The device according to claim 4, further including a generator that is connected to the shaft and adapted to supply electrical power from the device.

7. The device according to claim 1, where the device is adapted for the transport of heat to or from the gas in the outer-house channel.

8. The device according to claim 1, where said device is connected in series with a number of devices of the same type connected to the shaft and optionally with a turbine connected to the last device in the series.

9. The device according to claim 8, further including means to cool the gas in the outer-house channel in the series of devices, so that the gas can be supplied with high pressure without a turbine, or for liquefaction with a turbine in the last device of the series.

10. The device according to claim 8, further includes an outer closed-circuit channel between an outlet of the last device in the series and the inlet of an initial device in the series, as the last device includes fuel nozzles, oxygen nozzles and ignition mechanism, further including a cooling device designed to condense water and $CO_2$ from the outer closed-circuit channel that is diverted into dedicated channels.

11. The device according to claim 1, in which a number of brushes and means have been arranged to put the brushes in contact with the inside of the heat exchange tube to loosen deposited particles, as well as cleaning relay hatches designed to be opened to release the particles.

* * * * *